United States Patent [19]
Schwab et al.

[11] 3,787,307
[45] Jan. 22, 1974

[54] SENSING ELEMENT TO SENSE IONS IN LIQUIDS

[75] Inventors: Alfred Schwab, Ketsch; Rudolf Ehret, Schwetzingen, both of Germany

[73] Assignee: Pfaudler-Werke AG, Schwetzingen, Germany

[22] Filed: Oct. 13, 1971

[21] Appl. No.: 188,885

[30] Foreign Application Priority Data
July 15, 1971 Germany.......................... 2133419

[52] U.S. Cl. ............................ 204/195 G, 204/1 T
[51] Int. Cl. .......................................... G01n 27/36
[58] Field of Search ........................ 204/1 T, 195 G

[56] References Cited
UNITED STATES PATENTS

| | | | |
|---|---|---|---|
| 2,117,596 | 5/1938 | Bender et al. | 204/195 G |
| 2,462,843 | 3/1949 | Cary et al. | 204/195 G |
| 3,306,837 | 2/1967 | Riseman et al. | 204/195 G |
| 3,357,909 | 12/1967 | Riseman et al. | 204/195 G |
| 3,458,422 | 7/1969 | Proctor | 204/195 G |
| 3,498,901 | 3/1970 | Metz et al. | 204/195 G |
| 3,649,506 | 3/1972 | Petersen et al. | 204/195 G |

FOREIGN PATENTS OR APPLICATIONS

| | | | |
|---|---|---|---|
| 492,936 | 9/1938 | Great Britain | 204/195 G |
| 495,303 | 11/1938 | Great Britain | 204/195 G |
| 509,555 | 7/1939 | Great Britain | 204/195 G |

*Primary Examiner*—T. Tung
*Attorney, Agent, or Firm*—Flynn et al.

[57] ABSTRACT

A mechanically stable, solid, rod-like metallic carrier body has a base enamel layer fused thereover, on a portion of which a glass electrode is fused as a top cover; a top enamel layer is fused to the remainder of the base enamel layer, the base enamel layer can be of sufficient conductivity so that an electric potential can be sensed from the metallic body, or an electrical conductor, in contact with the glass, which can be fused between the enamel layers. A plurality of glass electrodes, of different response to ions can be placed on the same enameled metal carrier and separately connected to sensing apparatus.

13 Claims, 3 Drawing Figures

SENSING ELEMENT TO SENSE IONS IN LIQUIDS

The present invention relates to a measuring sensing element to test for ions in liquids, and particularly to measure the pH of a liquid, in which a glass electrode is applied to a metallic carrier element.

Glass electrodes, particularly of the type used for pH measurements usually consist of a glass membrane in the form of a glass ball, or glass hemisphere which is melted to a shaft of instrument glass or the like. The shaft of instrument glass is tubular and hollow, and is filled with a buffer solution, and a special reference electrode dips into this buffer solution. When the assembly is introduced into the liquid to be tested, the outer surface of the glass membrane will have an electric potential applied thereat depending on the concentration of ions in the liquid. The potential at the inner surface of the glass membrane is determined by the ion concentration of the reference liquid. The difference in surface potentials is determined by adding an additional conductor which dips into the liquid to be tested. This separate, or return conductor can be introduced into the liquid only indirectly, that is, over a liquid bridge or the like. The return conductor usually is dipped into a glass tube filled with potassium chloride which dips into the liquid to be tested. The contact between the liquids is established by a diaphragm formed at the bottom wall of the glass tube. Such a return conductor, with a liquid bridge, may be also termed a reference electrode. The potential between the glass electrode and the reference electrode, that is, the return conductor is then measured at a very high resistance input electrometer. Glass electrodes have been proposed which have a metal layer. Thus, rather than having a liquid filling at the inside of the glass electrode, the inner side of the electrode tube, or tubelet has an electrically conductive layer applied thereto. This avoids the use of the interior buffer solution and of the special working electrode. Just as in the liquid filled glass electrodes, a reference electrode or return electrode is necessary.

Glass electrodes as customarily used have the disadvantage of insufficient mechanical stability and strength. If a constant, continuous measuring of the pH value is desired as, for example, in chemical apparatus having stirrers therein, in which, due to high pressure, overpressures and turbulence are caused by the stirrer, substantial mechanical loadings arise, it has been found practically impossible to utilize such glass electrodes.

It has been proposed to use a metallic carrier element having a glass electrode applied thereover. Fusing larger electrode glass membranes to metal could not be carried out effectively, however [see Kratz, "Die Glaselektrode und ihre Anwendungen," Verlag (publisher) Steinkopf, 1950, page 59; in translation: "The Glass Electrode and its Use"].

Plastic materials have been proposed to mechanically support the glass electrodes with metallic coverings, the plastic masses including, for example, meltable putties, zeresine, or the like. It is difficult, however, to obtain materials having matching thermal coefficients of expansion between the glass electrode and the support mass, matching ranges being small and limited. The upper temperature limit is approximately 40° C (see the above referred to publication, particularly page 60). In many chemical apparatus, the temperatures are much higher and such mechanically supported glass electrodes therefore could not, practically, be used.

It is an object of the present invention to provide a sensing element to determine ion concentration which is mechanically stable, sturdy against shock or vibration and which can be used with high mechanical loading, particularly in chemical apparatus used for large-scale production, and having stirrer units or elements.

SUBJECT MATTER OF THE PRESENT INVENTION

Briefly, a metallic carrier body has a base enamel layer fused thereover; and a glass electrode is then fused over part of the base enamel coating to form a layer, at least in part, thereover. The remaining part of the enameled electrode is covered by a top enamel layer.

In accordance with a feature of the invention, the base enamel layer can be made sufficiently electrically conductive by certain additives, and the inner metallic carrier body, preferably of steel, can then act as a conductor to provide one electrical terminal for an electrical test apparatus. Preferably, however, the electrical potential is conducted to the outside of the sensing element by means of a separate electrical conductor, in conductive contact with the glass electrode and melted beneath the top enamel layer. The carrier metal for the enamel layer is then grounded and serves as an electrical shield for the embedded conductor. The test or sensing element can be used together with a customary reference electrode as known in the art; alternatively, the test element can be combined with a reference electrode and it is also possible to provide a sensing element in which glasses of various response characteristics to ions are selectively applied thereover.

The invention will be described by way of example with reference to the accompanying drawings, wherein.

Figure 1:
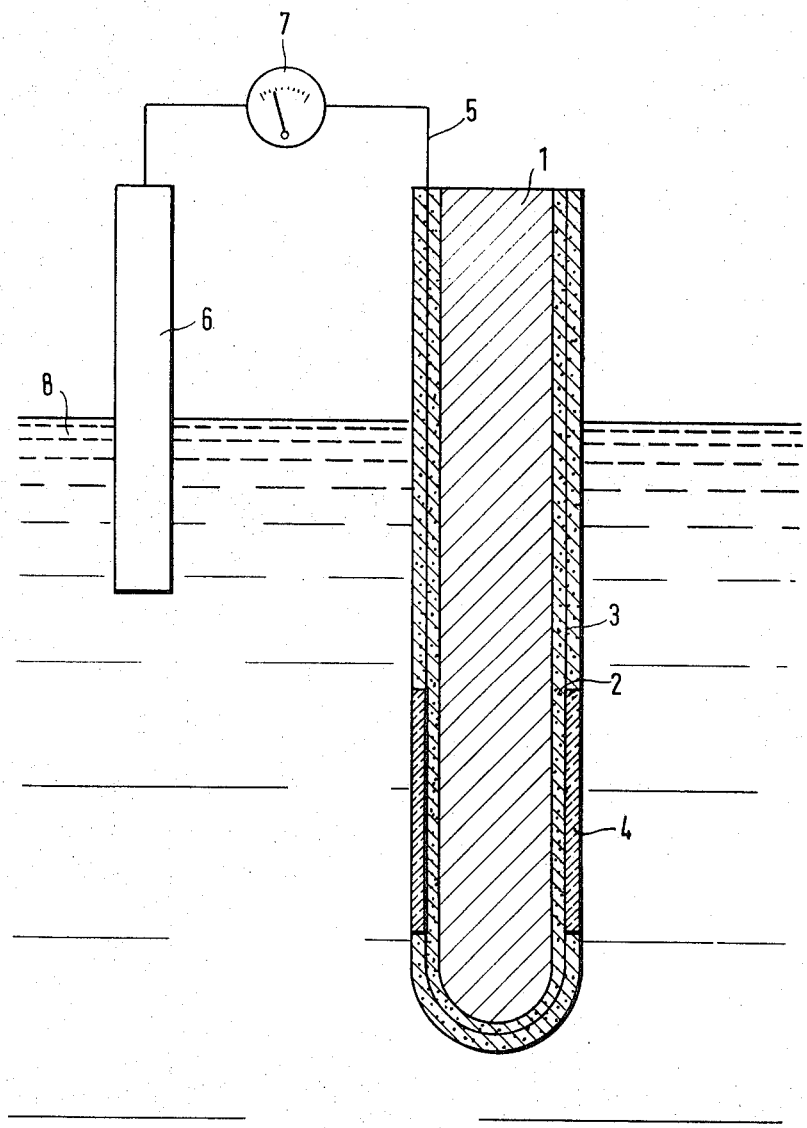
FIG. 1 is a longitudinal sectional view of a sensing element in a sensing system, utilizing a commonly known reference return electrode.

Embodiment of FIG. 1: A steel body 1 has a base enamel layer coating 2 fused thereto. A cover or top enamel coating 3 is fused thereover forming, over the major extent of the electrode a double enamel layer. The base enamel layer 2 and the cover enamel layer 3 have low electric conductivity, much lower than the glass of a glass electrode 4, fused on the base enamel layer 2. The glass electrode 4 is thus practically insulated from the steel body 1. The enamel layers can be applied in known manner, in accordance with known enamelling techniques. The form and shape of the steel carrier body 1 may be designed in accordance with any suitable design requirements, the particular shape shown (circular in cross-section) being only an example. The steel body 1 may be shaped, for example, to be a flow brake, or interruptor, that is, to cause turbulence when introduced into a stirring vessel; alternatively, it may be, or include a thermometer tube.

Electrical potential is conducted from glass layer 4 over an electrical conductor 5, embedded in the enamel layers 2 or 3. Conductor 5 is electrically connected to glass electrode 4. To determine ion concentration in test liquid 8, a reference electrode 6, as customary and usual in the art is used. An electrical potential will exist between the glass electrode 4 and the reference electrode 6, depending on ion concentration in the liquid to be tested. This potential is indicated on a volt meter 7 which preferably is of very high input impedance. The conductor 5 is not really necessary if the base enamel layer 2 beneath the glass electrode 4 has been doped, or otherwise modified with an additive to have sufficient electric conductivity so that the voltage between the reference electrode and the glass electrode can be sensed by making a direct connection with the steel body 1.

Figure 2:
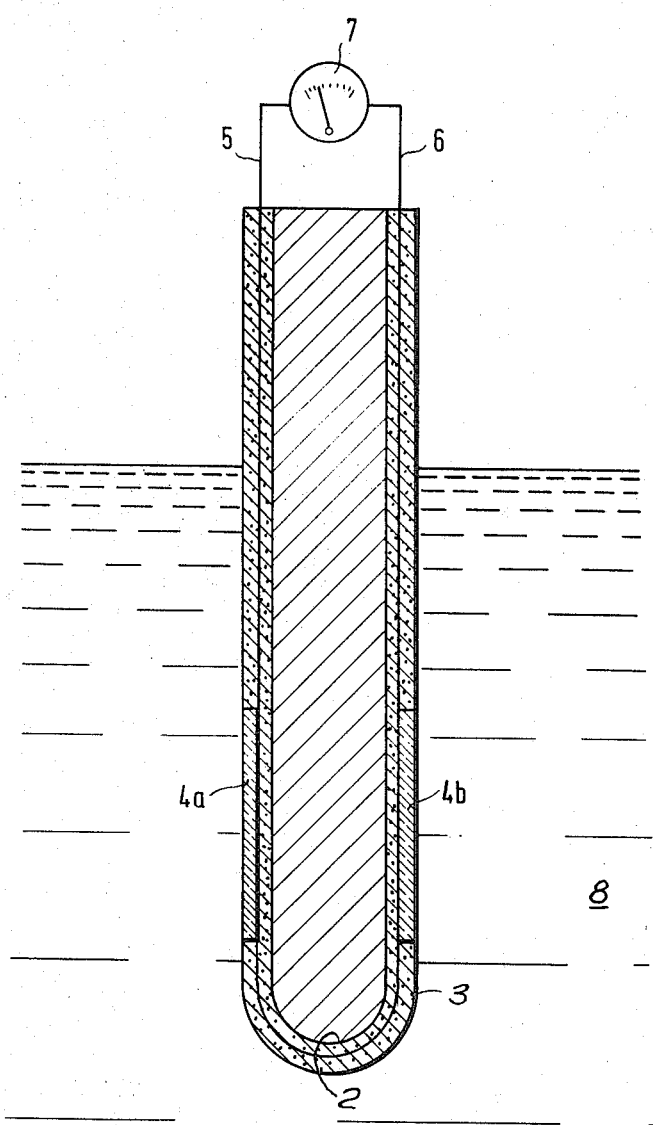
FIG. 2 is a longitudinal sectional view through a different embodiment, having two glass electrodes of different response characteristics.

Embodiment of FIG. 2: The reference electrode is not necessary, since a pair of glass electrodes 4a, 4b are provided, the glasses of the electrodes 4a, 4b having different characteristics. The glass electrodes 4a, 4b extend not quite over the half-circumference of a circular carrier, and are insulated from each other by the base enamel layers 2, 3. The electrical potential is measured between two embedded conductors 5, 6. The glasses are so chosen that they will have a different response for ions, and will thus deliver a voltage which depends on concentration, the voltage being indicated in instrument 7. This system is particularly useful if only a single type of ions changes its concentration, that is, particularly useful for measuring pH, where there will be no interference with random foreign ions.

Use of a reference electrode, similar to electrode 6 (FIG. 1) and separate connection of the two electrodes 4a, 4b to an indicating instrument (which can be time-shared) permits selective independent measurement of various types of ions. More than two glass electrodes similar to electrodes 4a, 4b, separated and insulated from each other may be applied to the carrier body 1 having enamel layer 2 applied thereover. The electrode glasses are so selected that they are responsive to specific types of ions. Two suitable glass electrodes on a single test unit can be utilized to simultaneously test for pH and pNa. Two or more volt meters are necessary, which can be connected, together, to a single reference or return electrode on the one hand and to the glass electrodes, specific to the various ions, on the other. A single instrument, time-shared by means of a scanning switch, or the like, may be used.

If the measuring fluid has expected changes in concentration of only a single type of ions, for example change in pH value, then use of two different glasses, having different sensitivity to the ions can be used to obtain a direct measurement of the ion concentration without use of the customary reference electrodes. A volt meter is then connected directly to the conductors of the two glass electrodes, as indicated in FIG. 2.

Figure 3:
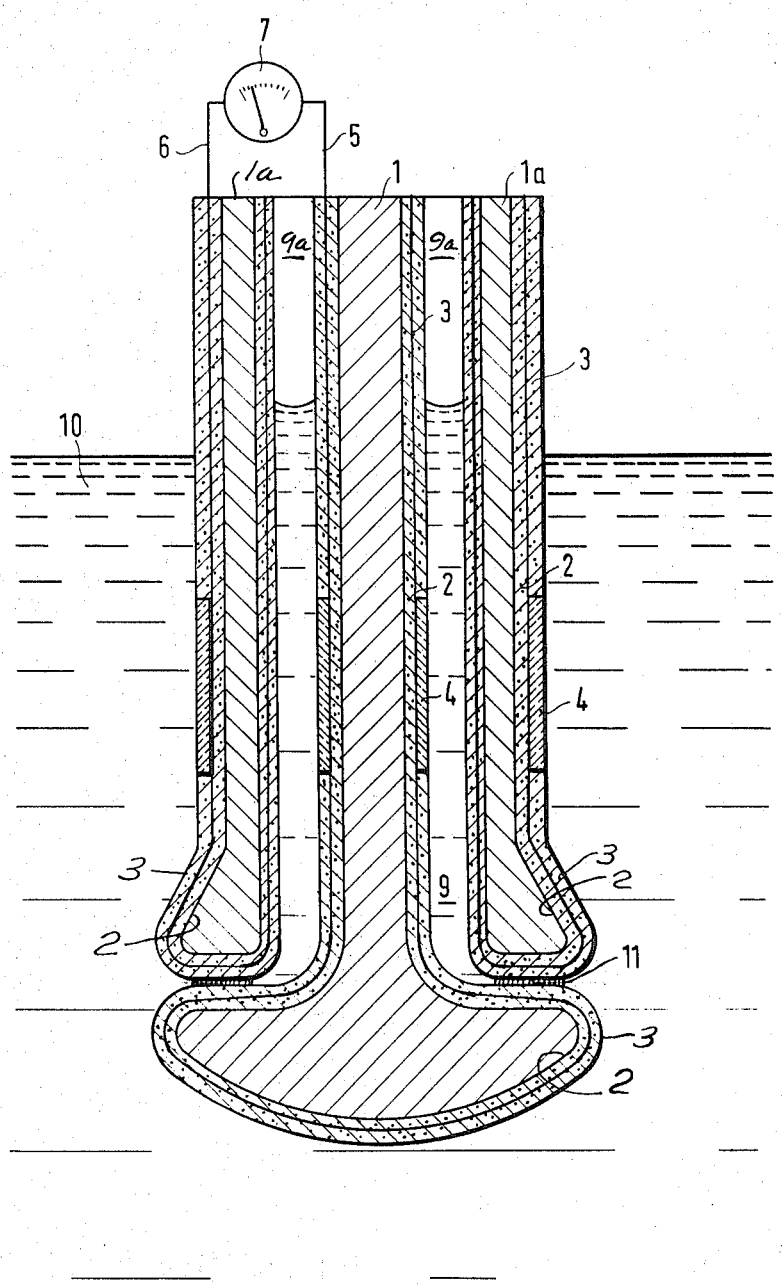
FIG. 3 is a longitudinal cross-sectional view having two similar glass electrodes, one being in contact with a reference liquid which is connected over a diaphragm with the liquid to be tested.

Embodiment of FIG. 3: A pair of glass electrodes 4 are insulated from steel bodies 1, 1a, respectively, by a base enamel coating 2 and a cover enamel coating 3. The inner steel body 1 is surrounded by the outer steel body 1a, the outer one having tubular cross-section, leaving a space between the steel bodies to provide a chamber 9a for a reference liquid 9. The enamel steel body 1 is mushroomed out at the lower end, so that between its upper surface and the adjacent enamelled surfaces of steel body 1a, a diaphragm surface 11 can be located. Diaphragm surface 11 may be formed as a ground, matching surface between the adjacent enamelled steel bodies. A reference liquid 9 is placed in the chamber which is in contact with the liquid 10 to be tested, located, for example, in a stirring-type vessel. Instrument 7, connected to the embedded conductors 5, 6 is then used to determine ion concentration. More than one ion selective glass electrode can be applied to the outer steel body 1a, permitting determination of ion concentration of different types of ions.

The structure of FIG. 3 is particularly useful for apparatus subject to high pressure and temperature. As before, if a plurality of glass electrodes are used, one or more volt meters or other electrical testing instruments are connected to the various conductors, or a single instrument can be used on a time-sharing arrangement. To provide for separate connection, separate conductors 5, 6 are used.

The sensing element is particularly sturdy mechanically and additionally can be subjected to sharp temperature differentials, for example abrupt temperature rises or drops in the order of 100° C. It is practically insensitive to pressure, and can be used with extremely high pressures. In contrast to known glass electrodes with a metal layer, it has been found by actual experiments that practically no long-term drift, or shifts, or aging effects arise. A test spanning 6 months indicated that the glass electrode provided a constant voltage. The sensing element made of enamelled metallic substances can be used advantageously in all applications in which concentrations of ions have to be measured when subjected to high pressure, rapid pressure variations, high temperatures, or steep temperature gradients. Such apparatus are particularly chemical apparatus having stirrers where additional mechanical strength is important. Known glass electrodes usually can be used only to be inserted in a shunt path. By applying various types of glasses having different response characteristics to ions, a single test and sensing element can be used for different types of ions; this is important particularly for chemical apparatus in which the number of inlet stubs through which such sensing elements can be introduced, is limited. The glass electrodes can be made to have substantial surface area. This permits reducing the electrode resistance so that enamels having high specific resistance which can be used for certain glass electrodes, can be applied as electrode material.

The glass for the glass electrode should have preferably a linear function relating ion concentration and the voltage difference, and at the same time provide for a substantial potential change for change in concentration, that is, provide a good dynamic response to change of concentration.

The maximum possible voltage change for each decade of concentration in n-valued ions is given by the Nernst factor, 2.3 $RT/nF$ (wherein $R$ is the gas constant; $T$ = absolute temperature; $F$ = Faraday constant). A theoretical slope of 59.1 mV/pH results with hydrogen ions at 25° C. In actual practice, the obtainable slope will depend on the composition of the enamel, and is usually less than the theoretical value.

The type of glass 4 to be used for the glass electrodes depends on the type of ions to be measured.

For pH measurement, boron and aluminum-free glasses are used. Suitable glasses 4 may be:

Example 1:
SiO$_2$ — 60 – 75 Mol percent
Na$_2$O — 15 – 25 Mol percent
CaO — 5 – 15 Mol percent
Li$_2$O — 0 – 5 Mol percent
ZnO — 0 – 2 Mol percent Suitable glasses 4 to determine concentration of alkaline ions will contain boron and/or aluminum, for example:

Example 2:
SiO$_2$ — 60 – 75 Mol percent
Na$_2$O — 10 – 25 Mol percent
CaO — 0 – 3 Mol percent
B$_2$O$_3$ — 0 – 15 Mol percent
Al$_2$O$_3$ — 0 – 12 Mol percent Various changes and modifications may be made within the scope of the inventive concept.

A suitable enamel to be used as a conductive coat beneath the glass electrode would have an additive of 30 – 50 weight percent of powdered silver or noble metal added to a normally used base enamel.

We claim:

1. Sensing element to sense ions in liquids comprising a mechanically stable metallic carrier body (1);
   a fused base enamel layer (2) fused on, and covering the entire surface of the carrier body (1) which is subject to being contacted by the liquid;
   a top enamel layer (3) covering a portion of the base enamel layer (2);
   an ion sensitive glass (4) covering the remaining portion of the base enamel layer (2), and forming a glass electrode,
   the top enamel layer (3) and the glass (4) being fused to the base enamel layer (2);
   and electrical conductive means in contact with the glass (4) and located beneath the top enamel layer (3) to connect the glass (4) to an external circuit.

2. Element according to claim 1, wherein the base enamel layer (2) is essentially electrically insulating;
   and said electrical conductive means comprises an electrical conductor (5, 6) melted into the enamel layers (2, 3) and in contact with the glass electrode (4).

3. Element according to claim 2, wherein said metallic carrier body is electrically grounded to form an electrical shield.

4. Element according to claim 1, wherein a plurality of glass electrodes (4) are fused to the base enamel layer (2) insulated from each other.

5. Element according to claim 4, wherein said electrical conductive means comprises a plurality of electrical conductors (5, 6) melted into the enamel layers, one conductor each being in electrical contact with a glass electrode (4).

6. Element according to claim 4, wherein the base enamel layer (2) is essentially electrically insulating;
   and the electrically conductive means (5, 6) are in contact with the electrodes and accessible from outside of the sensing element.

7. Element according to claim 4, including means forming a chamber (9a) having a diaphragm (11) at least in part defining a limit of the chamber, the diaphragm (11) separating the inside of the chamber (9a) from the liquid (10), the ions of which are to be sensed;
   a reference liquid (9) in the chamber;
   and one of the electrodes (4) being in contact with the reference liquid.

8. Element according to claim 1, wherein the enamel glass of the electrode (4) comprises
   SiO$_2$ — 60 – 75 Mol percent; Na$_2$O — 15 – 25 Mol percent; CaO — 5 – 15 Mol percent; Li$_2$O — 0 – 5 Mol percent; ZnO — 0 – 2 Mol percent.

9. Element according to claim 1, wherein the enamel glass of the electrode (4) comprises
   SiO$_2$ — 60 – 75 Mol percent; Na$_2$O — 10 – 25 Mol percent; CaO — 0 – 3 Mol percent; B$_2$O$_3$ — 0 – 15 Mol percent; Al$_2$O$_3$ — 0 – 12 Mol percent.

10. Element according to claim 1, wherein the base enamel layer (2) is non-insulating at least in the region beneath the glass electrode (4);
    and means connecting the metallic carrier body (1) into an electrical circuit.

11. Element according to claim 10, wherein the base enamel layer comprises an additive of 30 – 50 percent (by weight) of powdered silver or noble metal.

12. Element according to claim 1, wherein the carrier body (1) comprises steel.

13. Element according to claim 1, wherein the base enamel layer (2) is essentially electrically insulating;
    and said metallic carrier body is electrically grounded to form an electrical shield.

* * * * *

UNITED STATES PATENT OFFICE
CERTIFICATE OF CORRECTION

Patent No. 3,787,307    Dated January 22, 1974

Inventor(s) Alfred Schwab et al

It is certified that error appears in the above-identified patent and that said Letters Patent are hereby corrected as shown below:

Please correct the date of claimed priority to read:

Germany, 5 July, 1971

Signed and sealed this 16th day of July 1974.

(SEAL)
Attest:

McCOY M. GIBSON, JR.
Attesting Officer

C. MARSHALL DANN
Commissioner of Patents